Figure 1:
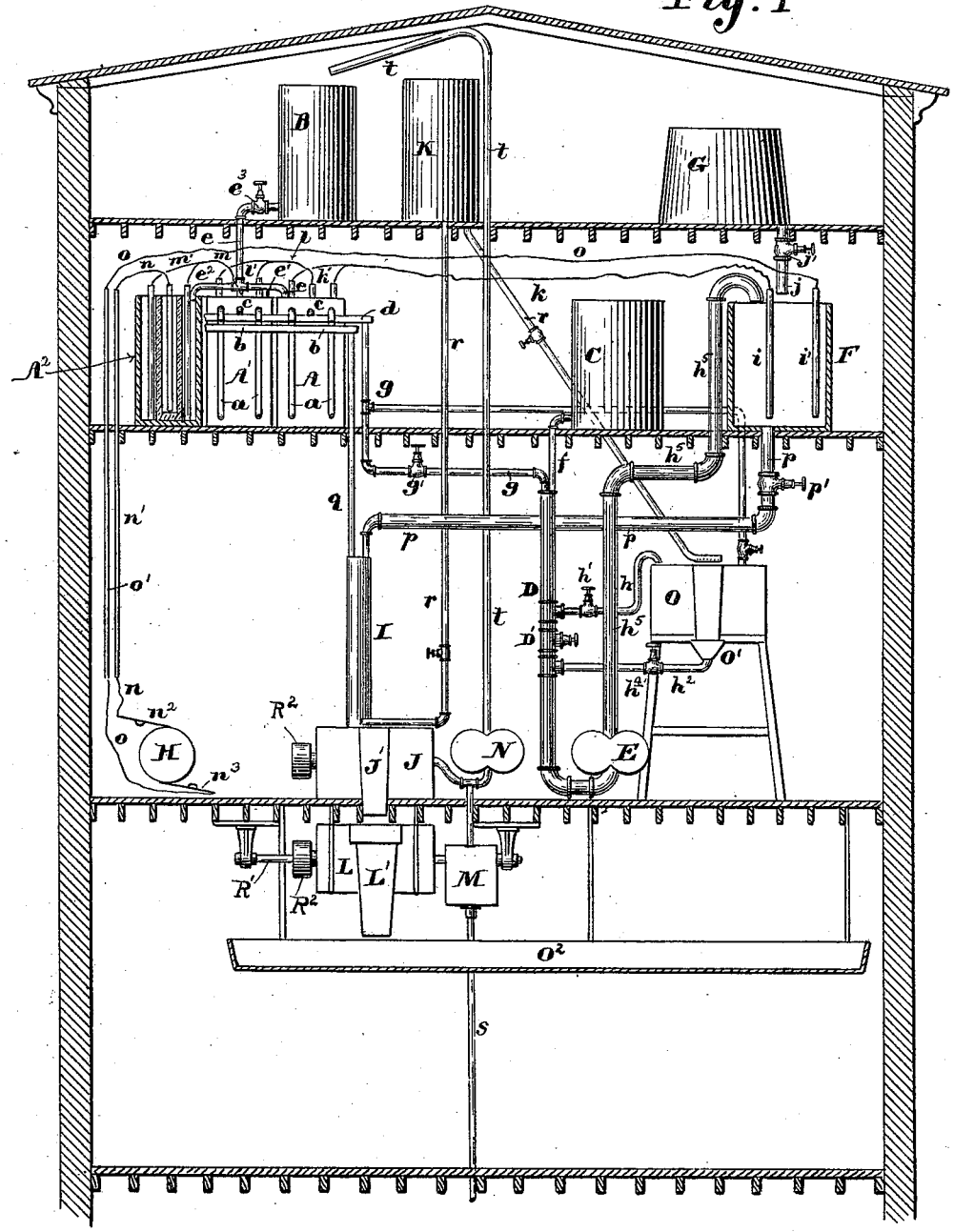

(No Model.) 2 Sheets—Sheet 1.
A. B. BROWNE & E. D. CHAPLIN.
PROCESS OF MANUFACTURING CHROMATE OF LEAD.
No. 538,998. Patented May 7, 1895.

Witnesses:
Walter E. Lombard.
Hartford Beaumont.

Inventors
Arthur Benj. Browne,
Edwin D. Chaplin,
by N. C. Lombard
Attorney.

(No Model.) 2 Sheets—Sheet 2.

A. B. BROWNE & E. D. CHAPLIN.
PROCESS OF MANUFACTURING CHROMATE OF LEAD.

No. 538,998. Patented May 7, 1895.

Witnesses:
Walter E. Lombard.
H. Theodore Fletcher.

Inventors:
Arthur Benj. Browne,
Edwin D. Chaplin,
by N. C. Lombard
Attorney.

UNITED STATES PATENT OFFICE.

ARTHUR BENJ. BROWNE, OF CAMBRIDGE, AND EDWIN D. CHAPLIN, OF NATICK, ASSIGNORS OF ONE-THIRD TO FRED FARROW, OF BOSTON, MASSACHUSETTS.

PROCESS OF MANUFACTURING CHROMATE OF LEAD.

SPECIFICATION forming part of Letters Patent No. 538,998, dated May 7, 1895.

Application filed April 18, 1894. Serial No. 508,004. (No specimens.)

*To all whom it may concern:*

Be it known that we, ARTHUR BENJAMIN BROWNE, of Cambridge, and EDWIN D. CHAPLIN, of Natick, in the county of Middlesex, State of Massachusetts, have invented a new and useful Process of Manufacturing Chromate of Lead, of which the following, taken in connection with the accompanying drawings, is a specification.

Our invention relates to the manufacture of chromate of lead and it consists in the process of manufacturing chromate of lead which consists in first producing a solution of a soluble salt of lead, as the nitrate, acetate or chloride, simultaneously preparing a solution of chrome alum, precipitating chrome hydrate therefrom, mixing said chrome hydrate with an excess of caustic alkali to redissolve it, mixing the resulting strongly alkaline solution with a solution of common salt, passing an electric current through said combined solutions to decompose the alkaline solution and produce a mixture of bichromate and chromate of potash, mixing said combined bichromate and chromate of potash with said salt of lead to precipitate lead chromate, filtering said lead chromate and washing it with water, refiltering it to remove the water, and finally drying the resultant product.

It further consists in the process of manufacturing chromate of lead by first producing a solution of a soluble salt of lead, as the nitrate, acetate or chloride, simultaneously preparing a solution of chrome alum, precipitating chrome hydrate therefrom, filtering and washing said chrome hydrate, mixing said filtered and washed chrome hydrate with an excess of caustic alkali to redissolve it, mixing the resulting strongly alkaline solution with a solution of common salt, passing an electric current through said combined solutions to produce a mixture of bichromate and chromate of potash; mixing said combined bichromate and chromate of potash with said solution of a soluble salt of lead to precipitate lead chromate, filtering said lead chromate and washing it with water, refiltering it to remove the water and finally drying the resulting product.

It further consists in the process of manufacturing chromate of lead, by first producing a solution of a soluble salt of lead, as the nitrate, acetate, or chloride, simultaneously producing a solution of a mixture of bichromate and chromate of potash, passing an electric current through an alkaline solution of chrome hydrate, mixing said solution of a mixture of bi-chromate and chromate of potash with said solution of a soluble salt of lead to precipitate lead chromate, filtering said lead chromate and washing it in water, refiltering it to remove the water, and finally drying the resultant product.

In carrying out our invention we use by preference an apparatus substantially as shown in the accompanying drawings, in which—

Figure 2:
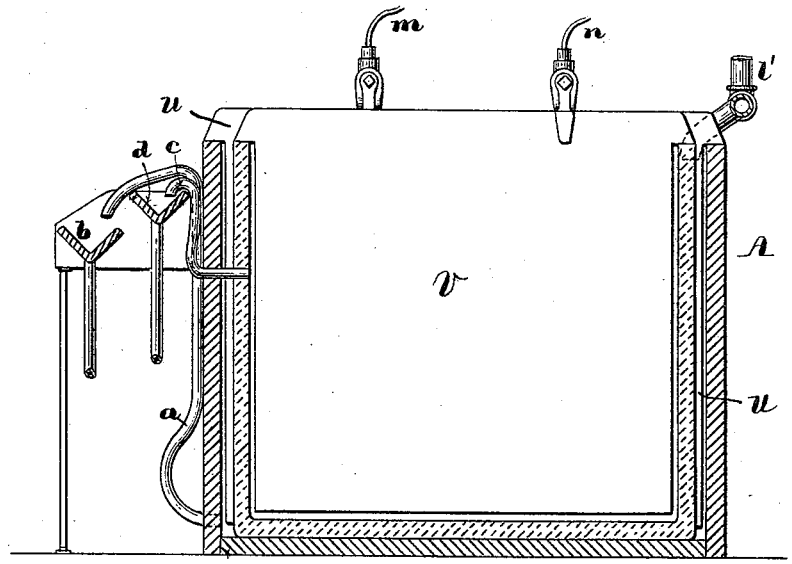
Figure 3:
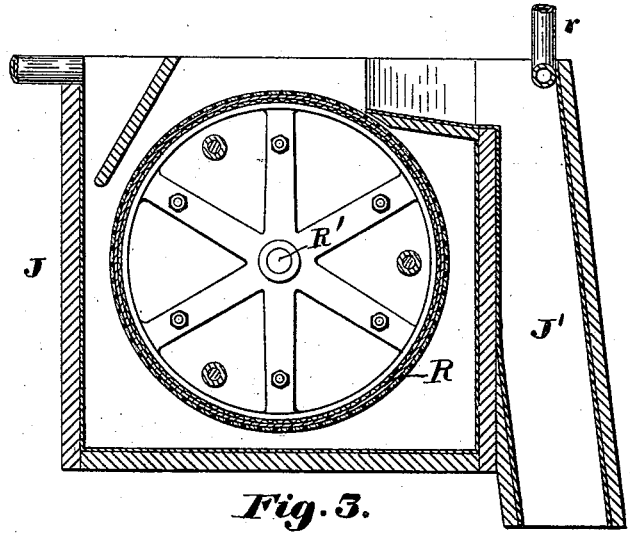

Figure 1 represents a vertical section through a building having several floors, with the necessary apparatus shown therein. Fig. 2 is a vertical transverse section through one of the electrolyzers, drawn to an enlarged scale, the cutting-plane being at right angles to the view shown in Fig. 1; and Fig. 3 is a transverse vertical section of one of the filters shown in Fig. 1, drawn to an enlarged scale.

In the drawings, A, A', A² represent a plurality of electrolyzing cells connected in series, each being provided with a porous cup, suitable anodes $u$ of metallic lead to be acted upon by the electric current and a cathode, $v$, which may be of lead, or any conducting material, pipes $a$ $a$ for drawing off the solution of a soluble salt of lead into the trough $b$, and pipes $c$ $c$ for drawing off the caustic alkali into the trough $d$.

The solution to be electrolyzed (nitrate, acetate or chloride of an alkaline base), is prepared in the tank B, preferably placed upon the floor above the electrolyzer A, A', A², and flows continuously through the pipes $e$ $e'$ $e^2$ into the several electrolyzer cells A, A', A², its flow being regulated by the valve $e^3$. The re-actions which occur in said electrolytic cells are substantially the same as described in Letters Patent No. 496,109, granted to Arthur Benj. Browne, April 25, 1893, but the solutions of soluble salts of lead and alkaline hydrate are separated by the introduction of porous cups. Simultaneously a solution of chrome alum is prepared in the tank C from which it flows through the pipe $f$ into the upper portion of the pipe D where chrome hydrate is precipitated by being mixed with a quantity of caustic alkali which flows from the trough $d$ through the pipe $g$ and valve $g'$ into said pipe D, which is provided with a valve D' at or near the middle of its length, by which it may be divided into two compartments or made into one at the will of the operator. The chrome hydrate precipitated in the upper portion of the pipe D flows through the pipe $h$ and valve $h'$ into the filter O where it is filtered and is discharged into the spout O' where it is mixed with an excess of caustic alkali by which the entire amount of said chrome hydrate is redissolved when it flows through the pipe $h^2$ and valve $h^4$ into the lower portion of the pipe D.

E represents a pump by which the strongly alkaline solution in the lower portion of the pipe D is pumped upward through the pipe $h^5$ and discharged into the electrolyzing tank F which is provided with insoluble electrodes $i$ $i'$ of carbon or any conductor that would be insoluble in the electrolyte and has no porous cup.

G is a tank, arranged above the electrolyzer F, and in which there is prepared a solution of common salt, which is drawn through the pipe $j$ and cock $j'$ into the electrolyzer F.

The electrode $i$ in the tank F is connected by the wires $k$ and $k'$ to the anodes $u$, $u$ in the cell A. The cathode $v$ in said cell is connected by the wires $l$ and $l'$ to the anodes $u$, $u$ in the cell A. The cathode $v$ in said cell is connected by the wires $m$ and $m'$ to the anodes $u$, $u$ in the cell $A^2$ and the cathode $v$ in said cell $A^2$ is connected by the wires $n$ and $n'$ to the brush $n^2$ on the negative side of the dynamo H or other source of electric force, while the brush $n^3$ on the positive side of said dynamo or source of electric force is connected by the wires $o$ and $o'$ to the electrode $i'$ in the electrolyzer tank F as shown. By the action of the electric current a mixture of bichromate and chromate of potash is formed in the electrolyzer F, is drawn off through the pipe $p$ and valve $p'$ and is mixed in the larger pipe I with the solution of a soluble salt of lead flowing from the trough $b$ through the pipe $q$ into said pipe I, resulting in a precipitate of lead chromate.

The method by which bi-chromate is formed in the electrolyzer F is according to the following formula, viz: $(2Cr_2O_6H_6+2NaOH)+2NaCl$ by electrolysis produces the following: $2Na_2CrO_4+Cr_2O_6H_6+8H+2Cl$. Indications of small quantities of hydrochloric acid are present but as it has no effect on the result it is omitted from the equation. By further electrolysis we have $+2Na_2CrO_4+Cr_2O_6H_6+8H=2Na_2Cr_2O_7+14H$.

In the formulas above given the sodium salts are used, but it is manifest that the potassium salts have the same reactions, and also that mixtures of the potassium and sodium salts would ultimately form the double chromates and bi-chromates.

Any mixture of the two chrome salts (chromate and bi-chromate) can be obtained by incomplete electrolysis. Hence the fundamental reason for using a mixture for precipitation; there being no necessity for complete separation. An additional reason is that the shade can be varied by judicious mixtures of the two chromates, corresponding lead compounds being formed. The lead chromate thus precipitated is discharged from said pipe I into the filter J and after the operation of filtration is washed with water drawn from the tank K, or other suitable supply, by means of the pipe $r$. The washed lead chromate together with the water used in washing it is discharged from the filter J through the discharge spout J' into the filter L where the bulk of the water is separated from the lead chromate and discharged into the closed tank M and thence through the pipe $s$ to any suitable receptacle or place of discharge.

The filters J and L, shown in the drawings, are provided with revoluble filter cylinders R, mounted upon shafts R', provided with the driving pulleys $R^2$, but we do not wish to be limited to the employment of this particular form of filter, as any kind of a filter, not excepting a paper filter, may be used without affecting the principles of our invention.

N is a second pump, connected by suitable suction pipes with the filter J and the closed tank M, by which the resulting solution of the salt, as the nitrate of soda, filtered from the mixture formed in the pipe I by the filter J, is pumped through the pipe $t$ into the tank B to be used over again.

The lead chromate after the water is removed therefrom is discharged from the filter L through the spout L' upon the table or tray $O^2$ where it is dried either in the common atmosphere or aided by artificial heat.

Chromate of lead may be produced without employing the filter O and pipe $h^2$ by closing the valve $h^4$ and opening the valve D', and mixing the chrome alum with an excess of caustic alkali in the pipe D to precipitate and redissolve it and pumping the same into the electrolyzer F as before described; but the chromate of lead so formed will contain a small amount of sulphate of lead but not sufficient to render it unfit for use for many purposes.

By the employment of our improved process chromate of lead of a fine quality may be produced very cheaply and expeditiously as compared with the processes heretofore practiced.

What we claim as new, and desire to secure by Letters Patent of the United States, is—

1. The process of manufacturing chromate of lead which consists in first producing a solution of a soluble salt of lead as the nitrate, acetate or chloride, simultaneously preparing a solution of chrome alum, precipitating chrome hydrate therefrom, mixing said chrome hydrate with an excess of caustic alkali to redissolve it, mixing the resulting strongly alkaline solution with a solution of common salt, passing an electric current through said combined solutions to produce a mixture of bichromate and chromate of potash, mixing said combined bichromate and chromate of potash with said solution of a soluble salt of lead to precipitate lead chromate and washing it with water, refiltering it to remove the water and finally drying the resultant product.

2. The process of manufacturing chromate of lead which consists in first producing a solution of a soluble salt of lead, as the nitrate, acetate or chloride, simultaneously preparing a solution of chrome alum, precipitating chrome hydrate therefrom, filtering said chrome hydrate and washing it, then mixing said filtered chrome hydrate with an excess of caustic alkali to redissolve it, mixing the resulting strongly alkaline solution with a solution of common salt, passing an electric current through said combined solutions to produce a mixture of bichromate and chromate of potash mixing said combined bichromate and chromate of potash with said solution of a soluble salt of lead to precipitate lead chromate, filtering said lead chromate and washing it with water, refiltering it to remove the water and finally drying the resultant product.

3. The process of manufacturing chromate of lead, which consists in first producing a solution of a soluble salt of lead, as the nitrate, acetate or chloride; simultaneously producing a solution of a mixture of bi-chromate and chromate of potash, by passing an electric current through an alkaline solution of chrome hydrate; mixing said solution of a mixture of bi-chromate and chromate of potash with said solution of a soluble salt of lead, to precipitate lead chromate; filtering said lead chromate and washing it in water, re-filtering it to remove the water, and finally drying the resultant product.

In testimony whereof we have signed our names to this specification, in the presence of two subscribing witnesses, on this 16th day of April, A. D. 1894.

ARTHUR BENJ. BROWNE.
EDWIN D. CHAPLIN.

Witnesses:
N. C. LOMBARD,
H. G. HALLORAN.